United States Patent Office 3,336,315
Patented Aug. 15, 1967

3,336,315
SUBSTITUTED QUINOLIZINES
Robert I. Meltzer, Rockaway, and Richard E. Brown, Hanover, N.J., assignors to Warner-Lambert Pharmaceutical Company, Morris Plains, N.J., a corporation of Delaware
No Drawing. Original application Jan. 2, 1963, Ser. No. 248,872. Divided and this application Oct. 31, 1966, Ser. No. 590,510
26 Claims. (Cl. 260—286)

This is a divisional application of application Ser. No. 248,872, filed Jan. 2, 1963.

This invention relates to novel substituted quinolizines having the following structural formula:

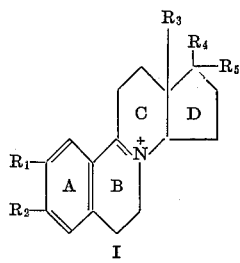

I

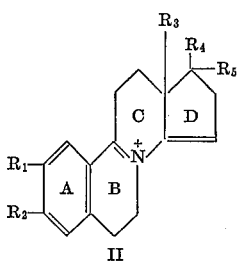

II

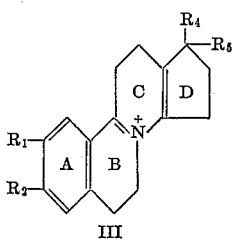

III

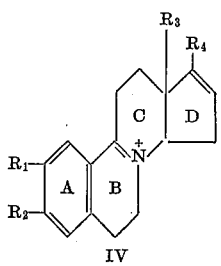

IV

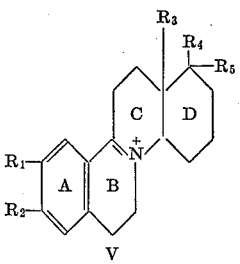

V

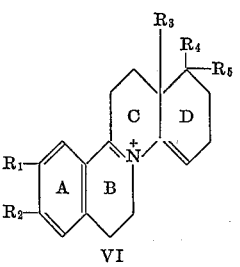

VI

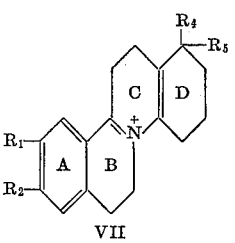

VII

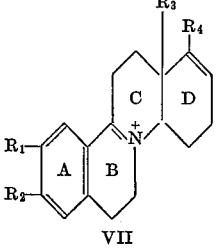

VII wherein $R_1$ and $R_2$ each represents hydrogen, hydroxy or lower alkoxy such as methoxy or methylene dioxy; $R_3$ represents hydrogen or lower alkyl such as methyl or ethyl; $R_4$ represents hydrogen, lower alkyl such as methyl or ethyl, alkenyl such as vinyl, alkynyl such as ethynyl, or alkoxy such as ethoxy; $R_5$ represents hydrogen, hydroxy, acyloxy, alkoxy, —COCH$_3$, —COCH$_2$OH, —COOEt, —COOH

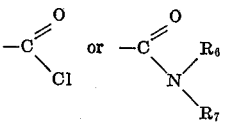

in which $R_6$ and $R_7$ may be hydrogen, lower alkyl or $R_6$ and $R_7$ taken together with the nitrogen to which they are attached form a heterocyclic radical such as

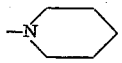

or $R_4$ and $R_5$ taken together with the carbon atom to which they are attached represent a keto radical such as

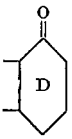

or a cyclic ketal radical such as

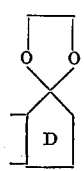

and to the nontoxic pharmaceutically acceptable acid addition and quarternary ammonium salts thereof.

The compounds of this invention are substituted quinolizines of the ring system comprised of the four rings denoted by A, B, C and D of the above formulas. When Ring D is a 5-membered ring such as

the substituents are in the bracketed positions which follow: $R_1$ (9), $R_2$ (8), $R_3$ (12a), $R_4$ (1) and $R_5$ (1) and when Ring D is a 6-membered ring such as

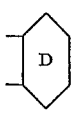

the substituents are in the bracketed positions which follow: $R_1$ (10), $R_2$ (9), $R_3$ (13a), $R_4$ (1) and $R_5$ (1). The numbering of these ring systems is indicated below:

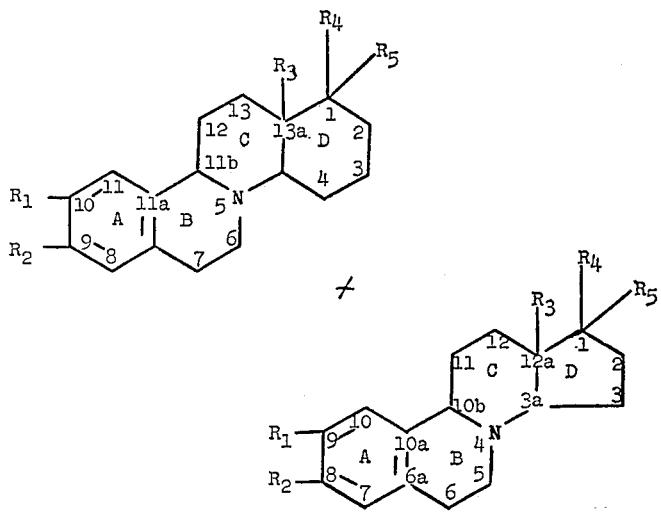

The above compounds, on treatment with an alkali, undergo a shift of the azomethine double bond according to the usual behavior of partially hydrogenated quinolizium compounds. Thus, for example, Compound I on treatment with an alkali metal hydroxide will result in the formation of a compound of the formula:

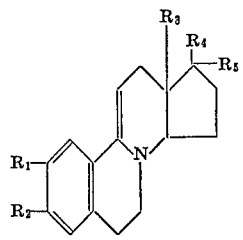

These compounds are also within the scope of this invention.

This invention also relates to a new and novel method of preparing the above compounds and to novel intermediates obtained during the synthesis. Exemplary of the new and novel qinolizines are:

2,3,3a,5,6,11,12,12a-octahydro-8-methoxy-1H-benzo-[a]cyclopenta[f]quinolizinium bromide
2,3,3a,5,6,11,12,12a-octahydro-8,9-dihydroxy-1H-benzo-[a]cyclopenta[f]quinolizinium bromide
2,3,3a,5,6,11,12,12a-octahydro-8-hydroxy-1H-benzo-[a]cyclopenta[f]quinolizinium bromide
1,2,3,3a,5,6,10b,11,12,12a-decahydrobenz[a]cyclopenta-[f]quinolizin-8-ol hydrobromide
2,3,4,4a,6,7,11b,12,13,13a-decahydro-9,10-dimethoxy-13a-methyl-1H-dibenzo[a,f]quinolizine hydrobromide
1,2,3,3a,5,6,10b,11,12,12a-decahydro-8,9-dimethoxy-benz[a]cyclopenta[f]quinolizine hydrobromide
1,2,3,3a,5,6,10b,11,12,12a-decahydro-8-methoxybenz-[a]cyclopenta[f]quinolizine hydrobromide
2,3,3a,5,6,11,12,12a-octahydro-8,9-dimethoxy-1H-benzo-[a]cyclopenta[f]quinolizinium dichlorophosphate
2,3,4,4a,6,7,13,13a-octahydro-9,10-dimethoxy-13a-methyl-1H-dibenzo[a,f]quinolizine and the like.

As can be readily appreciated the compounds of this invention resemble the steroid compounds structurally and can be considered to be azasteroids. If a steroid nomenclature is used the compound 3,3a,5,6,10b,11,12,12a-octahydro - 8 - hydroxy - 12a - methyl - benzo[a]cyclopenta[f] quinolizin-1(2H)-one which has the following structural formula:

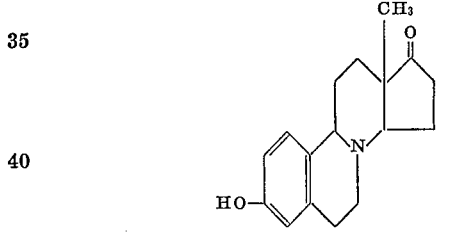

can also be named a stereo isomer of D,L 8-azaestrone.

The new and novel compounds of this invention have interesting pharmacological activity and are useful in the treatment of shock and circulatory collapse of the mammalian body such as dogs, rats, etc. They also possess steroidal-like activity. In order to use these compounds as anti-shock agents, these compounds may be combined with an inert pharmaceutical carrier to form dosage forms such as tablets, elixirs, and solutions for injection, with the active ingredient being present from about 0.1 mg. to 100 mg. per dosage unit. These compounds may be administered orally or by intramuscular injection at a dose of about 0.1 mg. to 100 mg. several times daily. In addition, they are valuable intermediates in the production of other compounds of this substituted quinolizine structure.

We have found that compounds of this invention may be produced in accordance with the reactions as exemplified in the following series of equations. The symbols $R_1$, $R_2$, $R_3$, $R_4$ and $R_5$ used hereinafter are the same as defined above.

Step I involves the condensation of substituted phenylalkylamines such as

by refluxing for about 3 to 6 hours in an inert organic solvent such as xylene with an equal molar ratio of a keto ester or acid such as carbalkoxyethyl cyclopentanone of the formula:

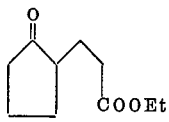

to obtain a yellow oily compound of the structure

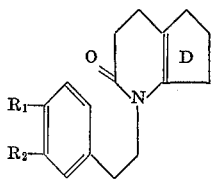

The $R_1$ and $R_2$ substituted phenylalkylamines such as 3,4-diethoxyphenylethylamines are well known compounds which are described in the literature, for example, in Chemical Abstracts, vol. 56, page 10006g and by Ide et al. in J.A.C.S., vol. 59, page 726 (1937).

The above compound may be cyclized by refluxing with phosphorous oxychloride to obtain a compound of the structure

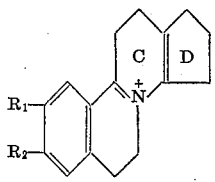

Alternatively, the compound may be reduced in accordance with Step II before it is cyclized. We have also found that the substituted phenylalkylamines may also be condensed with a keto ester of acid such as

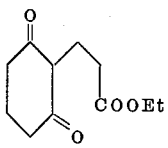

to give a compound of the structure

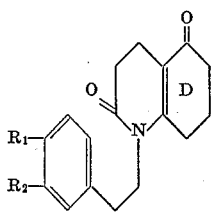

Step II is a reduction reaction of ring D, of the compounds obtained in accordance with Step I. The reduction, for example, may be effected employing catalytic reducing agents such as gaseous hydrogen under pressure and palladium on carbon in an inert solvent such as alcohol. The reduction results in the formation of saturated ring D of the structure

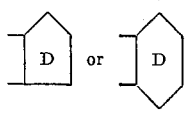

We have also found that when there is a keto group attached to ring D the reduction of the double bond in ring D also results in the reduction of the ketone to the corresponding alcohol such as

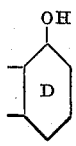

In the case where $R_3$ is hydrogen, this reduction is preferably carried out in the presence of an alkali.

Step III involves the cyclization of the compounds obtained in accordance with Step II. The cyclization is effected by refluxing with a slight excess of phosphorous oxychloride to obtain compounds of the structure

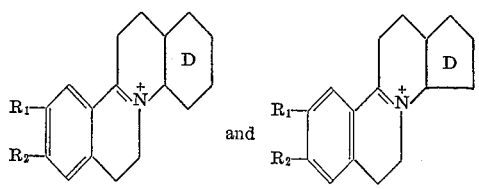

respectively.

When an —OH group is present on ring D such as

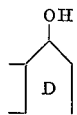

it is desirable to protect the —OH group when the compound is cyclized. We have found that the —OH may be protected by treating the parent compound bearing the —OH substituent with carboxylic acid anhydrides such as acetic anhydride, and after the cyclization has been completed the —OH group is restored by boiling with strong mineral acid. When the keto group is the desired substituent on ring D, the corresponding alcohol as obtained in Step II may be treated with chromic anhydride in acetone. This treatment results in the conversion of the —OH group to a keto group.

Before cyclization the keto group may also be converted to a cyclic ketal group by treating a solution in benzene of the compound bearing the ketone substituent with ethylene glycol in the presence of an acid catalyst such as toluene sulfonic acid. The conversion of the hydroxy group to a ketone may also be effected after the cyclization of the parent compound by treatment of the hydroxy compound with chromic anhydride in acetone.

We have also found that compounds having a lower alkyl substituent such as methyl at position 13 may be produced, for example, by first condensing a substituted phenylalkylamine such as m-methoxyphenethylamine with a keto ester such as 2-methyl-2-(β-carboxyethyl)-3-carboxycyclopentanane to produce a compound of the formula:

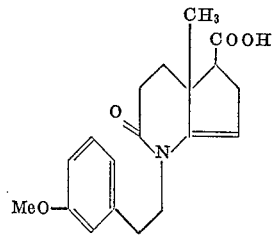

Said keto ester is prepared from 2-$R_3$-cycloalkane-1,3-diones which are in turn prepared according to the procedure of Panouse and Sannie published in Bull Soc. Chim. France, 1955, page 1036.

The above intermediate is then cyclized by refluxing with phosphorous oxychloride to produce a compound of the structure

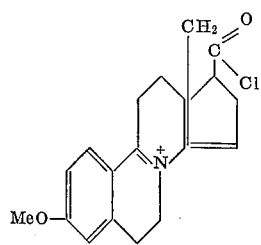

The order of Steps II and III are interchangeable in that reduction Step II may be preceded by the cyclization Step III which may then be followed by the reduction if the reduced product is desired. The order of the steps is not essential and is dependent on the ultimate product desired, although the reduction of Step II prior to Step III is preferable when $R_3$ is hydrogen. The acid chloride group introduced in the above example may serve as an intermediate to the preparation of many derivatives such as ester, amides, ketones, anhydrides, amines, alcohols, and the like.

We have also found that compounds such as II, III, IV, V, VI and VIII which contain a quaternary nitrogen atom can be reduced to the corresponding tertiary nitrogen by treatment with gaseous hydrogen in an inert solvent in the presence of a noble metal catalyst such as platinum or palladium on carbon.

In addition, we have also found that compounds wherein the substituents $R_1$ and $R_2$ are lower alkoxy can be dealkylated employing hydrobromic or hydroiodic acids.

In quaternary salts such as II, two diasterioisomeric forms of this structure are possible depending upon the cis or trans fusion of the C and D rings. Each of these diasterioisomeric forms on reduction of its azomethine linkage will give rise to two additional disasterioisomeric forms depending upon the configuration of hydrogen atom at position 12a or 13a. All these four diasterioisomeric forms are capable of being resolved into optically active antipodes.

The following examples are included in order further to illustrate the invention.

EXAMPLE 1

*1,2,3,4,4a,6,7,12,13,13a-decahydro-9,10-dimethoxy-1-oxo-dibenzo[a,f]quinolizium perchlorate*

A solution of 5.0 g. of 1-(3,4-dimethoxyphenethyl)-octahydro-5-hydroxy-2-(1H)quinoline in 500 ml. reagent grade acetone is cooled to 2° C. and treated all at once with vigorous stirring with 4.5 ml. of 8 N chromic anhydride in aqueous sulfuric acid. After stirring for 5 minutes at 2° C. 100 ml. of water are added, and the acetone is removed by distillation under reduced pressure. The green aqueous solution is extracted four times with benzene. The benzene solution is washed with 5% $NaHCO_3$ solution and water, dried, and treated with 5 ml. ethylene glycol and a few crystals of p-toluene sulfonic acid. This mixture is refluxed four hours under a Dean-Stark trap, then washed two times with 5% aqueous $NaHCO_3$ solution. The benzene solution is dried over $MgSO_4$ and treated with 25 ml. phosphorous oxychloride and refluxed for 1½ hours. The dark red solution is concentrated to dryness under vacuum, the oily residue dissolved in 2 N HCl and heated ½ hour on the steam bath. After cooling, the solution is treated slowly with 60% perchloric acid. The gummy precipitate is rubbed until solidification takes place. The yellow slurry is cooled for 16–24 hours and filtered to give 1,2,3,4,4a,6,7,12,13,13a-decahydro-9,10-dimethoxy-1-oxo-dibenzo[a,f]quinolizium perchlorate as a yellow solid, M.P. 206–209° C. The recrystallization product from 80% ethanol melts at 210–214° C.

EXAMPLE 2

*2,3,3a,5,6,11,12,12a-octahydro-8,9-dimethoxy-1H-benzo[a]cyclopenta[f]quinolizinium dichlorophosphate*

To a solution of 6.0 g. of 1-(3,4-dimethoxyphenethyl)-octahydro-2H-1-pyrindin-2-one in 90 ml. benzene is added 24 ml. phosphorous oxychloride and the solution refluxed for 1½ hours. The solution is cooled, diluted with 300 ml. petroleum ether, left two hours at 20–25° C. to obtain 2,3,3a,5,6,11,12,12a-octahydro-8,9-dimethoxy-1H - benzo[a]cyclopental[f]quinolizinium dichlorophosphate in the form of a precipitated solid. It is recrystallized from cold ethanol and ether to M.P. 147–148° C.

EXAMPLE 3

*2,3,5,6,11,12-hexahydro-8,9-dimethoxy-1H-benzo[a]cyclopenta[f]quinolizinium dichlorophosphate*

To a solution of 12 g. of 1-(3,4-dimethoxyphenethyl)-1,3,4,5,6,7-hexahydro-2H-1-pyrindin-2-one in 180 ml. benzene is added 48 ml. phosphorous oxychloride and the solution refluxed for two hours. The solution is cooled, diluted with 500 ml. petroleum ether, left at 20–25° C. for 16–24 hours. The precipitated oil is dissolved in 20 ml. acetone, scratched to induce crystallization and the slurry filtered to obtain 2,3,5,6,11,12-hexahydro-8,9-dimethoxy-1H-benzo[a]cyclopenta[f]quinolizinium dichlorophosphate in the form of a yellow solid which after recrystallization from isopropyl alcohol melts at 149–156° C.

EXAMPLE 4

*2,3,5,6,11,12-hexahydro-8-methxoy-1H-benzo[a]cyclopenta[f]quinolizinium dichlorophosphate*

In the same way as described in Example 3, 12 g. of 1,3,4,5,6,7-hexahydro-1-(m-methoxyphenethyl) - 2H - 1-pyrindin-2-one gives after recrystallization from acetone 2,3,5,6,11,12-hexahydro-8-methoxy - 1H - benzo[a]cyclopenta[f]quinolizinium dichlorophosphate in the form of off-white crystals, M.P. 179–181° C.

EXAMPLE 5

*2,3,3a,5,6,11,12,12a-octahydro-8-methoxy-12a-methyl-1-chloro-carbonyl-1H-benzo[a]cyclopenta[f]quinolizinium dichlorophosphate*

A solution of 5.0 g. of octahydro-1-(m-methoxyphenethyl)-4a-methyl-2-oxo-1H-1 - pyrindin-5-carboxylic acid in 50 ml. of phosphorous oxychloride is heated two hours at 100° C. and evaporated to obtain 2,3,3a,5,6,11,12,12a-octahydro-8-methoxy - 12a - methyl - 1 - chlorocarbonyl-1H - benzo[a]cyclopenta[f]quinolizinium dichlorophosphate as an oily residue. The oil is washed thoroughly with petroleum ether.

EXAMPLE 6

*2,5,6,11,12,12a-hexahydro-8,9 - dimethoxy - 12a - methyl-1 - carboxy-1H - benzo[a]cyclopenta[f]quinolizinium percholorate*

In the same way as described in Example 5, 4.5 g. of 1-(3,4-dimethoxyphenethyl)-2,3,4,4a,5,6-hexahydro - 4a-methyl-2-oxo-1H-1-pyrindin-5-carboxylic acid gives after reaction 2,5,6,11,12,12a-hexahydro-8,9 - dimethoxy - 12a-methyl-1-carboxy-1H - benzo[a]cyclopenta[f]quinolizinium percholorate in the form of a yellow crystalline salt which is recrystallized from ethanol-ether to a M.P. of 218–220° C.

EXAMPLE 7

*2,3,3a,5,6,11,12,12a - octahydro - 8,9 - dimethoxy - 12a-methyl-1 - oxo - 1H-benzo[a]cyclopenta[f]quinolizinium perchlorate*

A solution of 3.0 g. of 1-(3,4-dimethoxyphenethyl)-tetrahydro-4a-methyl - 1H - 1 - pyrindin-2,5(3H,6H)-dione in a mixture of 70 ml. benzene and 10 ml. phosphorous oxychloride is refluxed 15 minutes, then evaporated to an oil. The oil is taken up in water and a 10% solution of perchloric acid added slowly until precipitation is complete. The slurry is cooled for 20 hours at 10° to obtain 2,3,3a,5,6,11,12,12a - octahydro - 8,9 - dimethoxy - 12a-methyl-1-oxo - 1H - benzo[a]cyclopenta[f]quinolizinium perchlorate in the form of a yellow solid. The recrystallized form from ethanol-ether melts at 217–220° C.

EXAMPLE 8

*2,5,6,11,12,12a-hexahydro - 8,9 - dimethoxy - 12a-methyl-1-oxo - 1H - benzo[a]cyclopenta[f]quinolizinium - perchlorate*

In the same way as described in Example 7, 0.2 g. of 1-(3,4-dimethoxyphenethyl)-4,4a - dihydro - 4a - methyl- 1H-1-pyrindin - 2,5(3H,6H) - dione gives 2,5,6,11,12,12a-hexahydro-8,9-dimethoxy-12a-methyl-1-oxo - 1H - benzo[a]cyclopenta[f]quinolizinium perchlorate in the form of a yellow solid which after recrystallization from methanol-ether gives M.P. 242–245° C.

EXAMPLE 9

*2,5,6,11,12,12a-hexahydro - 8,9 - dimethoxy - 12a-methyl-1 - chlorocarbonyl - 1H - benzo[a]cyclopenta[f]quinolizinium dichlorophosphate*

A solution of 5.0 g. of 1-(3,4-dimethoxyphenethyl)-2,3,4,4a,5,6 - hexahydro - 4a - methyl - 2 - oxo-1H - 1-pyrindin-5-carboxylic acid in a mixture of 100 ml. of benzene and 25 ml. phosphorous oxychloride is refluxed two hours and cooled to obtain 2,5,6,11,12,12a-hexahydro - 8,9 - dimethoxy - 12a - methyl - 1 - chlorocarbonyl-1H - benzo[a]cyclopenta[f]quinolizinium dichlorophosphate in the form of crystals.

EXAMPLE 10

*2,5,6,11,12,12a - hexahydro - 8 - methoxy - 12a - methyl-1 - chlorocarbonyl - 1H - benzo[a]cyclopenta[f]quinolizinum dichlorophosphate*

A solution of 17.5 g. of 2,3,4,4a,5,6-hexahydro-1-(m-methoxyphenethyl)-4a-methyl-2-oxo - 1H - 1 - pyrindin-5-carboxylic acid in 150 ml. phosphorous oxychloride is heated 3 hours at 100° C. and evaporated under reduced pressure to obtain 2,5,6,11,12,12a-hexahydro-8-methoxy-12a-methyl-1 - chlorocarbonyl - 1H - benzo[a]cyclopenta[f]quinolizinium dichlorophosphate in the form of an oil.

EXAMPLE 11

*2(13a),3,4,4a,6,7,12,13-octahydro-9,10-dimethoxydibenzo[a,f]-quinolizinium perchlorate*

To a solution of 0.5 g. of 1-(3-,4-dimethoxyphenethyl)-octahydro-5-hydroxy-2(1H)-quinolone in 10 ml. benzene is added 2 ml. phosphorous oxychloride. The mixture is refluxed for two hours, evaporated to an oil and the oil is dissolved in water. The aqueous solution is treated dropwise with a 10% aqueous solution of perchloric acid until precipitation is complete to obtain 2(13a),3,4,4a,6,7,12,13-octahydro-9,10 - dimethoxydibenzo[a,f]quinolizinium perchlorate. The perchlorate salt is filtered and can be recrystallized from methanol to M.P. 223–225° C.

EXAMPLE 12

*1,2,3,4,4a,6,7,12,13,13a - decahydro - 1 - acetoxy - 9,10-dimethoxydibenzo[a,f]quinolizinium perchlorate*

In the same way as described in Example 11, 0.25 g. of 1-(3,4 - dimethoxyphenethyl)octahydro - 5 - hydroxy-2(1H)-quinolone acetate gives the yellow perchlorate salt 1,2,3,4,4a,6,7,12,13,13a - decahydro - 1 - acetoxy - 9,10-dimethoxydibenzo[a,f]quinolizinium perchlorate which can be recrystallized from methanol to yellow needles, M.P. 246.5–248° C.

EXAMPLE 13

*1,2,3,6,7,12,13,13a-octahydro-9,10-dimethoxy-1-oxo-13a-methyldibenzo[a,f]quinolizinium dichlorophosphate*

A solution of 1.8 g. of 1-(3,4-dimethoxyphenethyl)-3,4,6,7-tetrahydro-4a-methyl - 2,5(1H,4aH) - quinolinedione in a mixture of 70 ml. benzene and 7 ml. phosphorous oxychloride is refluxed for 1½ hours. The precipitated yellow solid is filtered and recrystallized from cold methanol-ether to obtain 1,2,3,6,7,12,13,13a-octahydro-9,10-dimethoxy-1 - oxo - 13a - methyldibenzo[a,f]quinolizinium dichlorophosphate in the form of bright yellow crystals, M.P. 166–168° C.

EXAMPLE 14

*2,3,3a,5,6,11,12,12a-octahydro-8,9-dimethoxy-12a-methyl-1-benzo[a]cyclopenta[f]quinolizinium iodide*

A solution of 37.4 g. of octahydro-1-(3,4-dimethoxyphenethyl)-4a-methyl-2H-1-pyridine-2-one in a mixture of 350 ml. benzene and 100 ml. phosphorous oxychloride is refluxed two hours and concentrated to an oil. The oil is dissolved in 100 ml. methanol and 250 ml. of 20% sodium hydroxide solution is added slowly with cooling. The slurry is cooled two hours at 10° C. and the solid is filtered. The residue is dissolved in an excess of 10% aqueous hydriodic acid and the solution evaporated in reduced pressure to obtain 2,3,3a,5,6,11,12,12a-octahydro-8,9-dimethoxy-12a - methyl - 1H - benzo[a]cyclopenta[f]quinolizinium iodide in the form of an oil. The oil crystallizes on rubbing with isopropyl alcohol and is recrystallized from methanol-ether to give yellow crystals, M.P. 205–207° C.

EXXAMPLE 15

*1,2,3,4,4a,6,7,12,13,13a - decahydro - 1 - hydroxy - 9-methoxydibenzo[a,f]quinolizinium bromide*

A solution of 1.0 g. of octahydro-5-acetoxy-1(m-methoxyphenethyl)-2(1H)-quinolone is refluxed for three hours with 50 ml. of 2 N hydrobromic acid. The solution is evaporated to dryness. The residue crystallizes from isopropanol to give 1,2,3,4,4a,6,7,12,13,13a-decahydro-1-hydroxy - 9 - methoxydibenzo[a,f]quinolizinium bromide in the form of a yellow solid which is recrystallized from methanol-ether, M.P. 219–220° C.

EXAMPLE 16

*1,2,3,4,4a,6,7,12,13,13a-decahydro-9-methoxy-1-oxodibenzo[a,f]quinolizinim bromide*

A solution of 55.5 g. of 1,2,3,4,4a,6,7,12,13,13a-decahydro - 1 - hydroxy - 9 - methoxydibenzo[a,f]quinolizinium perchlorate in 4 liters of reagent grade acetone at 2° C. is treated over a 5 minute period with rapid stirring with 82 ml. of 8 N chromic anhydride in sulfuric acid. After addition is complete the mixture is stirred for 5 minutes. A rapid stream of gaseous sulfur dioxide is passed through the mixture until precipitation of chromic salts is complete. The mixture is filtered and the acetone removed by evaporation. The oily residue is dissolved in 3 liters of hot water, cooled to 50° C. and poured into a slurry of ice and 500 ml. of 50% sodium hydroxide solution. The precipitated oil is extracted with 250 ml. portions of methylene chloride. The combined extracts are dried over magnesium sulfate and dry hydrogen bromide passed in until precipitation of the yellow oil is complete. The methylene chloride is evaporated and the oily residue dissolved in 100 ml. isopropyl alcohol and cooled for 72 hours to obtain 1,2,3,4,4a,6,7,12,13,13a - decahydro - 9-methoxy - 1 - oxodibenzo[a,f]quinolizinium bromide in the form of a yellow solid. The recrystallized form from ethanol-ether melts at 210–212° C.

EXAMPLE 17

*2,5,6,11,12,12a - hexahydro - 8 - methoxy - 1 - oxo - 12a-methyl - 1H - benzo[a]cyclopenta[f]quinolizium perchlorate*

A solution of 0.7 g. of 4,4a-dihydro-1-(m-methoxyphenethyl) - 4a - methyl-1H-1-pyridine-2,5(3H,6H)dione in a mixture of 27 ml. benzene and 2.7 ml. phosphorus oxychloride is refluxed 1½ hours. The mixture is decanted from the precipitated black tar and evaporated to an oil. The oil is boiled with 10 ml. water, cooled and decanted from more insoluble gum. The aqueous solution is treated with a 10% solution of perchloric acid until precipitation of the oil is complete. The oil crystallizes on rubbing with isopropyl alcohol and is recrystallized from isopropyl alcohol to obtain 2,5,6,11,12,12a - hexahydro - 8 - methoxy - 1 - oxo - 12a-methyl - 1H - benzo[a]cyclopenta[f]quinolizium perchlorate, M.P. 200-204° C.

EXAMPLE 18

*2,3,3a,5,6,11,12,12a - octahydro - 8 - methoxy - 1 - oxo- 12a - methyl - 1H - benzo[a]cyclopenta[f]quinolizinium bromide*

A solution of 3.9 g. of tetrahydro - 1 - (m-methoxyphenethyl) - 4a - methyl - 1H - 1 - pyridine - 2,5(3H,6H)- dione in 30 ml. benzene is refluxed with 13 ml. phosphorous oxychloride for 15 minutes. The benzene and phosphorous oxychloride are removed and the residual red oil dissolved by heating in 25 ml. water. After cooling, the solution is extracted with ether and the yellow aqueous solution cooled and made basic with dilute sodium hydroxide. The oily precipitate is extracted with ether and dry gaseous hydrogen bromide is passed through the ethereal extract. The oily quaternary bromide solidifies on rubbing with acetonitrile to give 2,3, 3a, 5,6,11,12,12a - octahydro - 8 - methoxy - 1 - oxo- 12a - methyl - 1H - benzo[a]cyclopenta[f]quinolizinium bromide in the form of yellow needles. After recrystallization from ethyl-acetate-acetonitrile the product melts at 211–213° C.

EXAMPLE 19

*1,2,3,6,7,12,13,13a - octahydro - 9,10 - dimethoxy - 13a- methyldibenzo[a,f]quinolizinium bromide*

In the same way as described in Example 18, 20 g. of 1 - (3,4 - dimethoxyphenethyl) - 3,4,4a,5,6,7 - hexahydro - 4a - methyl - 2(1H) - quinolone gives 1,2,3,6, 7,12,13,13a - octahydro - 9,10 - dimethoxy - 13a - methyldibenzo[a,f]quinolizinium bromide in the form of a yellow solid which after recrystallization from isopropyl alcohol-ether melts at 173–174° C.

EXAMPLE 20

*2,3,3a,5,6,11,12,12a - octahydro - 8,9 - dihydroxy - 1H- benzo[a]cyclopenta[f]quinolizinium bromide*

A solution of 1.0 g. of 2,3,3a,5,6,11,12,12a-octahydro- 8,9 - dimethoxy - 1H - benzo[a]cyclopenta[f]quinolizinium dichlorophosphate in 10 ml. of 48% hydrobromic acid is refluxed for 4 hours. The excess acid is removed by distillation under reduced pressure. The oil crystallizes on scratching with ethanol and is recrystallized from ethanol-ether to obtain 2,3,3a,5,6,11,12,12a-octahydro- 8,9 - dihydroxy - 1H - benzo[a]cyclopenta[f]quinolizinium bromide melting at 222–224° C.

EXAMPLE 21

*1,2,3,4,4a,6,7,12,13,13a - decahydro - 9,10 - dihydroxy- 13a-methyldibenzo[a,f]quinolizinium bromide*

In the same way as described in Example 20, 10 g. of 2,3,4,4a,6,7,13,13a - octahydro - 9,10 - dimethoxy - 13a- methyl-1H-dibenzo[a,f]quinolizine are demethylated to give 1,2,3,4,4a,6,7,12,13,13a - decahydro - 9,10 - dihydroxy - 13a - methyldibenzo[a,f]quinolizinium bromide as yellow crystals which, after being recrystallized from methanol-ether melt at 256–258° C.

EXAMPLE 22

*1,2,3,6,7,12,13,13a - octahydro - 9,10 - dihydroxy - 13a- methyldibenzo[a,f]quinolizinium bromide*

In the same way as described in Example 20, 2.4 g. of 1,2,3,6,7,12,13,13a - octahydro - 9,10 - dimethoxy- 13a - methyldibenzo[a,f]quinolizinium bromide are demethylated to give 1,2,3,6,7,12,13,13a - octahydro - 9,10- dihydroxy - 13a - methyldibenzo[a,f]quinolizinium bromide as yellow crystals which, after recrystallization from methanol-ether melt at 225–227° C.

EXAMPLE 23

*2,3,3a,5,6,11,12,12a - octahydro - 8,9 - dihydroxy - 12a- methyl - 1H - benzo[a]cyclopenta[f]quinolizinium bromide*

In the same was as described in Example 20, 6.0 g. of 2,3,3a,5,6,11,12,12a - octahydro - 8,9 - dimethoxy- 12a - methyl - 1H - benzo[a]cyclopenta[f]quinolizinium bromide are demethylated to give 2,3,3a,5,6,11,12,12a- octahydro - 8,9 - dihydroxy - 12a - methyl - 1H - benzo [a]cyclopenta[f]quinolizinium bromide as yellow crystals which, after being recrystallized from methanol-ether melt at 243–244° C.

EXAMPLE 24

*1,2,3,4,4a,6,7,12,13,13a - decahydro - 9 - hydroxy - 1- oxodibenzo[a,f]quinolizinium bromide*

In the same way as described in Example 20, 6.0 g. of 1,2,3,4,4a,6,7,12,13,13a - decahydro - 9 - methoxy - 1- oxodibenzo[a,f]quinolizinium bromide are demethylated to give 1,2,3,4,4a,6,7,12,13,13a - decahydro - 9 - hydroxy- 1 - oxodibenzo[a,f]quinolizinium bromide as a yellow solid which, after being recrystallized from methanol-ether melts at 241–244° C.

EXAMPLE 25

*1,2,3,4,4a,6,7,12,13,13a - decahydro - 1,9 - dihydroxydibenzo[a,f]quinolizinium bromide*

A solution of 6.1 g. of 1,2,3,4,4a,6,7,12,13,13a-decahydro - 1 - hydroxy - 9 - methoxydibenzo[a,f]quinolizinium bromide in 80 ml. of 48% hydrobromic acid is refluxed for 20 minutes then evaporated to an oil under reduced pressure. The oil crystallizes on rubbing with ethanol to obtain 1,2,3,4,4a,6,7,12,13,13a-decahydro-1,9- dihydroxydibenzo[a,f]quinolizinium bromide as a yellow solid which, after being recrystallized from ethanol- ether melts at 264–267° C.

EXAMPLE 26

*2,3,3a,5,6,11,12,12a - octahydro - 8 - hydroxy - 1H - benzo [a]cyclopenta[f]quinolizinium bromide*

A solution of 9.3 g. of 2,3,3a,5,6,11,12,12a-octahydro- 8 - methoxy - 1H - benzo[a]cyclopenta[f]quinolizinium perchlorate in 100 ml. acetone is cooled to 10° C. with ice and poured into 300 ml. of a 5% solution of sodium hydroxide. The precipitated solid is filtered, dissolved in 150 ml. of 48% hydrobromic acid and refluxed for 6 hours. The excess acid is removed by distillation under reduced pressure to obtain 2,3,3a,5,6,11,12,12a - octahydro - 8 - hydroxy - 1H - benzo[a]cyclopenta[f] quinolizinium bromide as a solid residue which, after being recrystallized from methanol melts at 275–277° C.

It is understood that the foregoing detailed description is given merely by way of illustration and that many variations may be made therein without departing from the spirit of our invention.

Having described our invention, what we desire to secure by Letters Patent is:

1. A compound selected from the group consisting of those having the formulas:

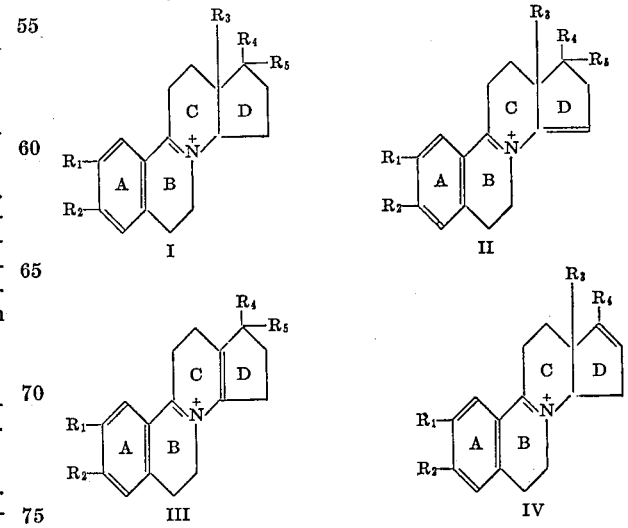

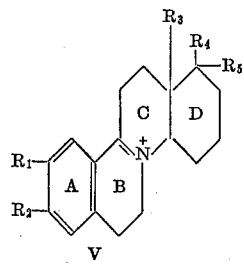

V

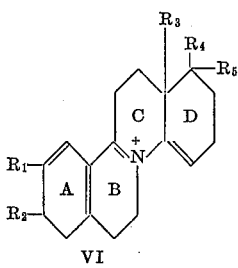

VI

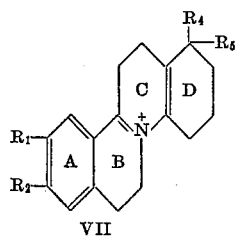

VII

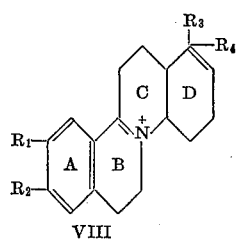

VIII wherein $R_1$ and $R_2$ each is a member selected from the group consisting of hydrogen, hydroxy, and lower alkoxy, $R_3$ is a member selected from the group consisting of hydrogen, methyl and ethyl, $R_4$ is a member selected from the group consisting of hydrogen, lower alkyl, alkoxy, alkenyl, and $R_5$ is a member selected from the group consisting of hydrogen, hydroxy, acyloxy, of a carboxylic acid, alkoxy, —COOH, —COOR$_{11}$ in which $R_{11}$ is lower alkyl,

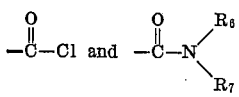

in which $R_6$ and $R_7$ is each a member selected from the group consisting of hydrogen, and lower alkyl; and $R_4$ and $R_5$ taken together with the carbon atom to which they are attached form a member selected from the group consisting of keto and cyclic ketal.

2. The compound of claim 1 which is 2,5,6,11,12, 12a-hexahydro - 8-methoxy-12a-methyl-1-chlorocarbonyl-1H-benzo[a]cyclopenta[f]quinolizinium dichlorophosphate.

3. The compound of claim 1 which is 2,3,3a,5,6,11,12, 12a - octahydro - 8-methoxy-12a-methyl-1-chlorocarbonyl-1H - benzo[a]cyclopenta[f]quinolizinium dichlorophosphate.

4. The compound of claim 1 which is 2,3,3a,5,6,11,12, 12a-octahydro - 8 - methoxy - 1H - benzo[a]cyclopenta[f] quinolizinium bromide.

5. The compound of claim 1 which is 2,3,3a,5,6,11,12, 12a - octahydro - 8 - hydroxy - 1H-benzo[a]cyclopenta[f] quinolizinium bromide.

6. The compound of claim 1 which is 2,3,5,6,11,12-hexahydro - 8 - methoxy - 1H - benzo[a]cyclopenta[f] quinolizinium dichlorophosphate.

7. The compound of claim 1 which is 2,3,3a,5,6,11,12, 12a - octahydro - 8,9 - dimethoxy-1H-benzo[a]cyclopenta [f]quinolizinium dichlorophosphate.

8. The compound of claim 1 which is 2,3,5,6,11,12-hexahydro - 8,9 - dimethoxy - 1H-benzo[a]cyclopenta[f] quinolizinium dichlorophosphate.

9. The compound of claim 1 which is 2,3,3a,5,6,11,12, 12a - octahydro - 8,9 - dihydroxy-1H-benzo[a]cyclopenta [f]quinolizinium bromide.

10. The compound of claim 1 which is 1,2,3,6,7,12,13, 13a - octahydro - 9,10 - dimethoxy - 1-oxo-13a-methyldibenzo[a,f]quinolizinium dichlorophosphate.

11. The compound of claim 1 which is 3,4,4a,6,7,12,13, 13a - octahydro - 9,10 - dimethoxydibenzo[a,f]quinolizinium perchlorate.

12. The compound of claim 1 which is 1,2,3,4,4a,6,7, 12,13,13a - decahydro - 1 - acetoxy - 9,10 - dimethoxydibenzo[a,f]quinolizinium perchlorate.

13. The compound of claim 1 which is 1,2,3,4,4a,6,7, 12,13,13a - decahydro - 1 - hydroxy - 9,10 - dimethoxydibenzo[a,f]quinolizinium bromide.

14. The compound of claim 1 which is 1,2,3,4,4a,6,7, 12,13,13a - decahydro - 9,10 - dimethoxy - 1 - oxo-dibenzo [a,f]quinolizinium bromide.

15. The compound of claim 1 which is 2,5,6,11,12,12a-hexahydro - 8,9 - dimethoxy - 12a - methyl-1-chlorocarbonyl-1H-benzo[a]cyclopenta[f]quinolizinium dichlorophosphate.

16. The compound of claim 1 which is 2,5,6,11,12,12a-hexahydro - 8,9 - dimethoxy - 12a - methyl - 1-carboxy-1H-benzo[a]cyclopenta[f]quinolizinium perchlorate.

17. The compound of claim 1 which is 2,5,6,11,12, 12a - hexahydro - 8 - methoxy - 1 - oxo-12a-methyl-1H-benzo[a]cyclopenta[f]quinolizinium perchlorate.

18. The compound of claim 1 which is 2,3,3a,5,6,11,12, 12a - octahydro - 8 - methoxy - 1 - oxo-12a-methyl-1H-benzo[a]cyclopenta[f]quinolizinium perchlorate.

19. The compound of claim 1 which is 1,2,3,4,4a,5,6, 12,13,13a - decahydro - 9,10 - dihydroxy - 13a - methyldibenzo[a,f]quinolizinium bromide.

20. The compound of claim 1 which is 1,2,3,6,7,12, 13,13a - octahydro - 9,10 - dimethoxy - 13a-methyldibenzo [a,f]quinolizinium bromide.

21. The compound of claim 1 which is 1,2,3,6,7,12,13, 13a - octahydro - 9,10 - dihydroxy - 13a - methyldibenzo [a,f]quinolizinium bromide.

22. The compound of claim 1 which is 2,3,3a,5,6,11,12, 12a - octahydro - 8,9 - dimethoxy - 12a - methyl-1H-benzo [a]cyclopenta[f]quinolizinium bromide.

23. The compound of claim 1 which is 1,2,3,4,4a,6,7, 12,13,13a - decahydro - 9 - methoxy - 1 - oxodibenzo[a,f] quinolizinium bromide.

24. The compound of claim 1 which is 1,2,3,4,4a,6,7, 12,13,13a - decahydro - 1 - hydroxy - 9 - methoxydibenzo [a,f]quinolizinium bromide.

25. The compound of claim 1 which is 1,2,3,4,4a,6,7, 12,13,13a - decahydro - 9 - hydroxy - 1 - oxodibenzo[a,f] quinolizinium bromide.

26. The compound of claim 1 which is 1,2,3,4,4a,6,7, 12,13,13a - decahydro - 1,9 - dihydroxydibenzo[a,f]quinolizinium bromide.

References Cited

Kanaoka: Chem. Pharm. Bull., vol. 7, pp. 595–7 (1959).

ALEX MAZEL, *Primary Examiner.*

D. DAUS, *Assistant Examiner.*